T. GRUNDMANN.
APPARATUS FOR THE MANUFACTURE OF VINEGAR.
No. 110,229. Patented Dec. 20, 1870.
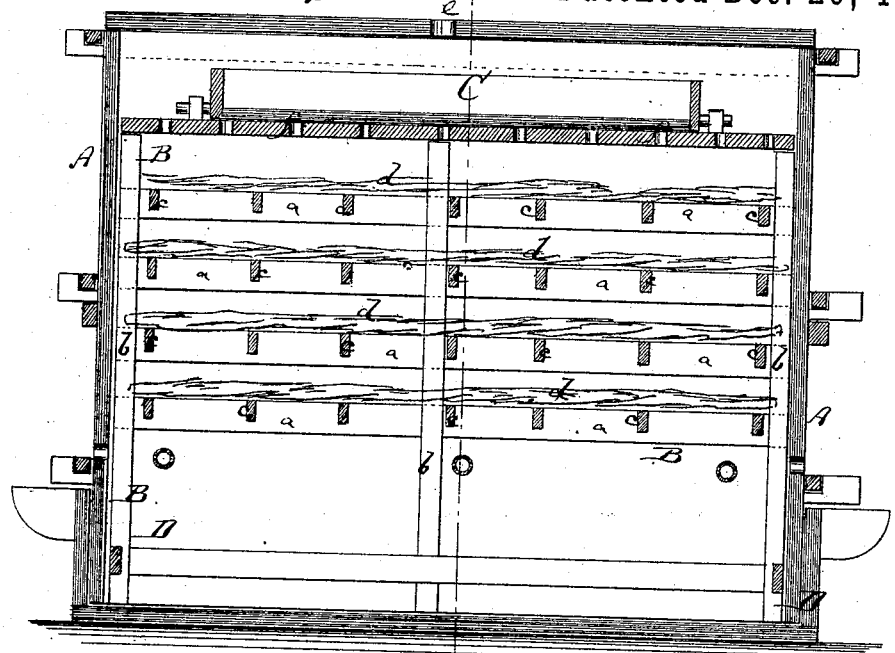
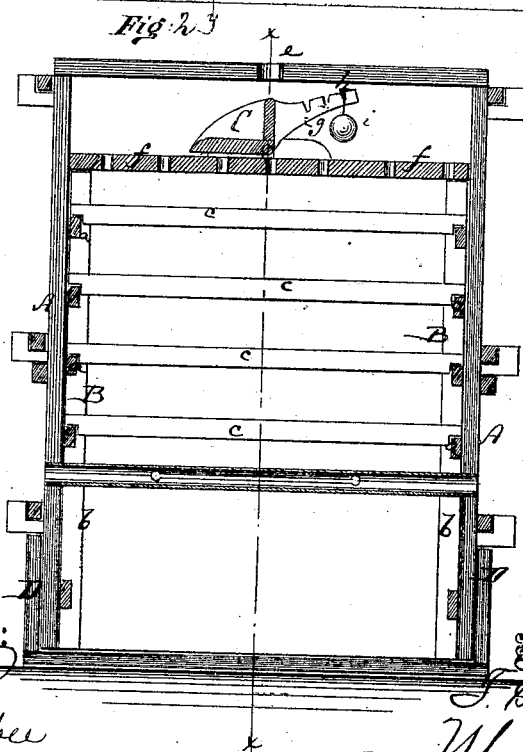

UNITED STATES PATENT OFFICE.

THEODORE GRUNDMANN, OF CINCINNATI, OHIO.

IMPROVEMENT IN APPARATUS FOR THE MANUFACTURE OF VINEGAR.

Specification forming part of Letters Patent No. 110,229, dated December 20, 1870.

*To all whom it may concern:*

Be it known that I, THEODORE GRUNDMANN, of Cincinnati, in the county of Hamilton and State of Ohio, have invented a new and Improved Vinegar Apparatus; and I do hereby declare that the following is a full, clear, and exact description thereof, which will enable others skilled in the art to make and use the same, reference being had to the accompanying drawing, forming part of this specification, in which—

Figure 1 represents a vertical longitudinal section of my improved vinegar apparatus, $x$ $x$ being the section-line. Fig. 2 is a vertical transverse section of the same, $y$ $y$, Fig. 1, being the section-line.

Similar letters of reference indicate corresponding parts.

This invention relates to certain improvements on the apparatus for making vinegar now in use, and has for its object, chiefly, to avoid the use of braided straw or other fabric, and to permit the employment of plain loose straw, cane, branches of trees or shrubs, or other simple material.

The invention consists in arranging within the outer case or chamber a frame containing a series of cross-bars, on which the straw or other loose material is supported in a series of horizontal layers.

The invention consists, also, in the use of an adjustable self-dumping trough, whereby the liquor is introduced in the apparatus at certain desired intervals.

A in the drawing represents the outer chamber or case, in which the oxidizing process is to be carried on. It is made in sections, so that it may be taken apart, or of other suitable construction. Within it is set up an open frame, B, containing a series of horizontal longitudinal side bars, $a$ $a$, which are held on uprights $b$, as shown.

The side bars, $a$, are notched at suitable distances apart to receive the ends of cross-bars $c$ $c$. Upon these cross-bars are placed layers, $d$, of straw, cane, twigs, or other loose material, the several layers being at suitable distances apart.

The fermenting liquor is, through an opening, $e$, in the cover of the case A, poured into a swinging distributing box or trough, C, which is pivoted at the ends to ears projecting from the perforated top plate, $f$.

Arms $g$ $g$ project from one side of the trough, and serve to support a bar, $h$, from which a weight, $i$, is suspended.

The liquor flows into the trough through the opening $e$, and is, when said trough is filled sufficiently heavy to dump the same, to be discharged upon the plate $f$.

When the trough is emptied it is again swung up by the weight $i$, to receive the requisite amount of liquid before being again dumped, thus giving the former contents time to be distributed through the machine.

The weighted bar can be moved on the arms $g$, and thereby regulates the amount of liquor necessary for dumping the trough.

The liquor poured upon the perforated plate $f$ trickles down upon the upper layer, $d$, of straw, or equivalent material, and will gradually find its way from one layer to another until it is finally collected in a bottom receptacle, D, whence it can be drawn off at will.

While the liquor slowly passes from one layer to another, and while it is spread on the several pieces of straw or other material, it is in thin films exposed to the air which passes through the case A, and is fully oxidized by the same.

The air-openings in the lower part of the case may be of suitable kind and distributed in suitable manner.

By the use of my improved apparatus much room is saved, and the expensive matting heretofore required, or the cumbersome slat-work, is dispensed with.

This apparatus, owing to the thin flat layers, can be made much lower than any heretofore in use, while its length and width may be of suitable size. It may therefore be built to conveniently fit a room of ordinary size and be efficient for extensive operation.

Having thus described my invention, I claim as new and desire to secure by Letters Patent—

1. The frame B, set up in a vinegar apparatus and provided with cross-bars $c$, for supporting the several layers of loose straw or other material, substantially as herein shown and described.

2. A vinegar apparatus containing layers of loose straw or other loose material, for a proper distribution of the liquid, as set forth.

3. The pivoted trough C, provided with the adjusable weight $i$, to be made self-dumping, substantially as herein shown and described.

THEODORE GRUNDMANN.

Witnesses:
F. A. DOSSMANN,
FRED. GOOSMANN.